United States Patent
Christianson et al.

(10) Patent No.: US 11,443,106 B2
(45) Date of Patent: Sep. 13, 2022

(54) INTELLIGENT NORMALIZATION AND DE-NORMALIZATION OF TABLES FOR MULTIPLE PROCESSING SCENARIOS

(71) Applicant: International Business Machines Corporation, Armonk, NY (US)

(72) Inventors: Kyle G. Christianson, Rochester, MN (US); Hassan Nadim, San Francisco, CA (US); Joshua S. Allen, Durham, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/136,721

(22) Filed: Sep. 20, 2018

(65) Prior Publication Data
US 2020/0097532 A1 Mar. 26, 2020

(51) Int. Cl.
*G06F 40/18* (2020.01)
*G06F 16/23* (2019.01)
*G06F 40/103* (2020.01)
*G06F 40/177* (2020.01)

(52) U.S. Cl.
CPC .......... *G06F 40/18* (2020.01); *G06F 16/2365* (2019.01); *G06F 40/103* (2020.01); *G06F 40/177* (2020.01)

(58) Field of Classification Search
CPC .................................................. G06F 16/2365
See application file for complete search history.

(56) References Cited

U.S. PATENT DOCUMENTS

| 5,604,854 | A  | * | 2/1997  | Glassey ............. G06F 40/18 715/788 |
|-----------|----|---|---------|------------------------------------------|
| 6,510,420 | B1 |   | 1/2003  | Cessna et al.                            |
| 7,054,871 | B2 |   | 5/2006  | Hu et al.                                |
| 7,089,492 | B2 |   | 8/2006  | Anderson                                 |
| 7,415,481 | B2 |   | 8/2008  | Becker et al.                            |
| 7,594,165 | B2 |   | 9/2009  | Chen et al.                              |
| 8,335,981 | B2 |   | 12/2012 | Naibo et al.                             |
| 8,914,419 | B2 |   | 12/2014 | Gerard et al.                            |
| 9,286,290 | B2 |   | 3/2016  | Allen et al.                             |
| 9,311,371 | B2 |   | 4/2016  | Mohan et al.                             |
| 9,489,364 | B2 |   | 11/2016 | Rosner                                   |
| 9,524,286 | B2 |   | 12/2016 | Evans et al.                             |
| 9,715,487 | B2 |   | 7/2017  | Rapp                                     |

(Continued)

OTHER PUBLICATIONS

Teacher's Tech, Mar. 19, 2018 (https://www.youtube.com/watch?v=k1VUZEVuDJ8).*

(Continued)

*Primary Examiner* — Justin S Lee
(74) *Attorney, Agent, or Firm* — Terrile, Cannatti & Chambers, LLP; Emmanuel A. Rivera

(57) ABSTRACT

A method, system and computer-usable medium are disclosed for finding vertically and horizontally aligned cells in a complex table structure. A file or document, such as an HTML file that defines a complex table includes spanning rows and columns is expanded into a two dimensional (2D) array or table with orthogonal rows and columns, where the spanning rows and columns included cells with copied values or object references. The expanded 2D array or table can be deduplicated row or column wise to determine header alignment of the table.

20 Claims, 14 Drawing Sheets

(56) References Cited

U.S. PATENT DOCUMENTS

| | | | |
|---|---|---|---|
| 9,734,181 | B2 | 8/2017 | Wang et al. |
| 9,785,830 | B2 | 10/2017 | Hausmann et al. |
| 9,940,380 | B2 | 4/2018 | Fourny et al. |
| 10,235,437 | B2 | 3/2019 | Diwan et al. |
| 10,706,218 | B2 * | 7/2020 | Milward .............. G06F 40/166 |
| 2003/0097384 | A1 | 5/2003 | Hu et al. |
| 2005/0268222 | A1 * | 12/2005 | Cheng ................... G06F 40/143 |
| | | | 715/234 |
| 2006/0117051 | A1 | 6/2006 | Chin |
| 2006/0156221 | A1 | 7/2006 | Chen et al. |
| 2007/0288412 | A1 * | 12/2007 | Linehan ................ G06Q 10/06 |
| | | | 706/45 |
| 2009/0044090 | A1 | 2/2009 | Gur et al. |
| 2009/0313205 | A1 | 12/2009 | Hino et al. |
| 2011/0289398 | A1 | 11/2011 | Chin |
| 2012/0303630 | A1 | 11/2012 | Gelfand |
| 2014/0040806 | A1 * | 2/2014 | Anderson ............. G06F 40/177 |
| | | | 715/771 |
| 2014/0108906 | A1 * | 4/2014 | Kelley .................. G06F 40/177 |
| | | | 715/227 |
| 2014/0369602 | A1 | 12/2014 | Meier et al. |
| 2015/0007010 | A1 | 1/2015 | Byron et al. |
| 2015/0379057 | A1 | 12/2015 | Wang et al. |
| 2016/0292240 | A1 | 10/2016 | Diwan et al. |
| 2017/0329749 | A1 * | 11/2017 | Milward .............. G06F 40/166 |
| 2017/0371955 | A1 | 12/2017 | Allen et al. |
| 2018/0060292 | A1 | 3/2018 | Rullan et al. |
| 2019/0138588 | A1 | 5/2019 | Silk et al. |
| 2019/0340240 | A1 | 11/2019 | Duta |
| 2019/0370540 | A1 | 12/2019 | Freed et al. |
| 2020/0097541 | A1 * | 3/2020 | Christianson ....... G06F 16/3323 |

OTHER PUBLICATIONS

Cheuseva "How to convert Excel tables to HTML" Sep. 11, 2018 https://www.ablebits.com/office-addins-blog/2014/03/21/convert-excel-html/.*

CCR Data Ltd Data Cleansing—Deduplication in Excel Jan. 26, 2012, hereinafter "CCR", (https://www.youtube.com/watch?v=6HNX_tk2VxU).*

Contextures Inc. "Change Horizontal Data to Vertical" Jan. 8, 2011, (https://www.youtube.com/watch?v=ZWu5MetIwIE).*

Wikipedia, Contingency Table, May 28, 2018.

Wikipedia, Pivot Table, May 28, 2018, Jun. 20, 2018.

Jim Gray et al., "Data cube: A relational aggregation operator generalizing group-by, cross-tab, and sub-totals," Data mining and knowledge discovery 1, No. 1 (1997): 29-53.

Jianying Hu et al., "Table structure recognition and its evaluation," In Document Recognition and Retrieval VIII, vol. 4307, pp. 44-56. International Society for Optics and Photonics, 2000.

David W. Embley et al., "Table-processing paradigms: a research survey," International Journal of Document Analysis and Recognition (IJDAR) 8, No. 2-3 (2006): 66-86.

docparser.com, "Howto parse tables with complex layouts?" printed Jul. 9, 2018, https://support.docparser.com/article/1312-how-to-parse-tables-with-complex-layouts.

Svitlana Vakulenko et al., "TableQA: Question Answering on Tabular Data," Aug. 30, 2017, https://arvix.org/pdf/1705.06504.pdf.

Ana Costa E Silva et al., Design of an end-to-end method to extract information from tables, International Journal of Document Analysis and Recognition (IJDAR) 8, No. 2-3 (2006): 144-171.

Chris West, JavaScript Snippet—Convert HTML Table to 2D Array, Chris West's Blog, http://cwestblog.com/2016/08/21/javascript-snippet-convert-html-table-to-2d-array/, Aug. 21, 2016.

Sharad Seih et al., "Analysis and taxonomy of col. header categories for web tables," Proceedings of the 9th IAPR International Workshop on Document Analysis Systems (DAS '10). ACM, New York, NY, USA, 81-88.

George Nagy et al., "Data extraction from web tables: The devil is in the details," Document Analysis and Recognition (ICDAR), 2011 International Conference on, pp. 242-246. IEEE, 2011.

experts-exchange.com, convert html table into an array, https://www.experts-exchange.com/questions/21911184/convert-html-table-into-an-array.html, printed Sep. 4, 2018.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload-Lrue&isnumber-6177717.

Sebastian Raschka, About Feature Scaling and Normalization—and the effect of standardization for machine learning algorithms, https://sebastianraschka.com/Articles/2014_about_feature_scaling.html, Jul. 11, 2014.

Mitch Sanders, Machine Learning Pre-Processing: Scaling, Standardizing, Normalizing, http://datareality.blogspot.com/2016/11/scaling-normalizing-standardizing-which.html. Nov. 29, 2016.

Michael J. Cafarella et al., Uncovering the Relational Web, Jun. 13, 2008 http://sirrice.github.io/files/papers/relweb-webdb08.pdf.

Jing Fang et al., Table Header Detection and Classification, Proceedings of the Twenty-Sixth AAAI Conference on Artificial Intelligence, Toronto, Ontario, Canada, Jul. 22-26, 2012 https://pdfs.semanticscholar.org/2e4c/cf5445490a176dabdf77a5e39cb11f88970c.pdf.

Jingjing Wang et al., Understanding Tables on the Web, 2012 https://homes.cs.washington.edu/~jwang/publications/webtables.pdf.

Xing Wei et al., Table Extraction for Answer Retrieval, Abstract, Inf Retrieval, vol. 9, Issue 5, pp. 589-611, Nov. 2006, https://rd.springer.com/content/pdf/10.1007%2Fs10791-006-9005-5.pdf.

George Nagy et al., End-to-End Conversion of HTML Tables for Populating a Relational Database, Abstract, 2014 11th IAPR International Workshop on Document Analysis Systems, Apr. 7-10, 2014, http://ieeexplore.ieee.org/document/6831002/.

Ferrucci et al., Building Watson: An Overview of the DeepQA Project. AI Magazine, 2010, pp. 1-26. (Year: 2010).

Li et al., A Normalized Levenshtein Distance Metric, IEEE Transactions on Pattern Analysis and Machine Intelligence, 26:6, pp. 1091-1095, 2007.

* cited by examiner

```
        # Next insert the previous rowspans and save the new rowspans.
        index = 0
        num_cells = len(row) + len(rowspan_dict)
        last_index = max([num_cells-1] + list(rowspan_dict.keys()))
        while index <= last_index:
            if index in rowspan_dict:
                # Found a previous rowspan to insert.
                (rowspan_cell, remaining_rowspan) = rowspan_dict[index]
                # Check for overlapping rowspan and colspan.
                if (index > 0 and index < len(row) and
                        row[index] == row[index-1]):
                    # Overlapping rowspan and colspan exists so replace
                    # the cell instead of inserting it. This gives precedence
                    # to the rowspan over the colspan.
                    row[index] = rowspan_cell
                    last_index -= 1
                else:
                    row.insert(index, rowspan_cell)
                # Update the dictionary.
                if remaining_rowspan <= 1:
                    del rowspan_dict[index]
                else:
                    remaining_rowspan -= 1
                    rowspan_dict[index] = (rowspan_cell, remaining_rowspan)
            else:
                if index < len(row):
                    # If the current cell has a rowspan, add it to the dict.
                    rowspan = row[index].get_rowspan()
                    if rowspan > 1:
                        remaining_rowspan = rowspan - 1
                        rowspan_dict[index] = (row[index], remaining_rowspan)
                else:
                    row.insert(index, EMPTY_CELL)
            index += 1 row_len = len(row)
    if row_len > 0:
        expanded_table_matrix.append(row)
        max_col_index = max(max_col_index, row_len-1)

# Fill out the matrix by appending empty cells to shorter rows.
for row in expanded_table_matrix:
    for index in range(len(row), max_col_index+1):
        row.append(EMPTY_CELL)

# Collapse the table rowspan and colspans were possible.
# This makes the table appear the same as browsers render it.
# _collapse_table(expanded_table_matrix)
return expanded_table_matrix
```

FIGURE 5B

```
[
  [Cell 1, Cell 2, Cell 2, Cell 2, Cell 2, Cell 2],
  [Cell 1, Cell 4, Cell 4, Cell 3, Cell 5, Cell 5],
  [Cell 1, Cell 6, Cell 7, Cell 3, Cell 8, Cell 9],
]
```

FIGURE 7

Vegetable prices in Melbourne and Sydney

|  |  | Beans | Peas |  | Carrots | Tomatoes |
|---|---|---|---|---|---|---|
| Melbourne | | | | | | |
| | Imported | Wholesale | | Domestic | Wholesale | |
| | | $2.00 | $3.00 | | $1.80 | $1.60 |
| | | Retail | | | Retail | |
| | | $2.20 | $4.00 | | $3.20 | $3.00 |
| Sydney | | | | | | |
| | Imported | Wholesale | | Domestic | Wholesale | |
| | | $3.00 | $4.00 | | $2.80 | $2.60 |
| | | Retail | | | Retail | |
| | | $4.20 | $5.00 | | $3.80 | $4.00 |

FIGURE 8

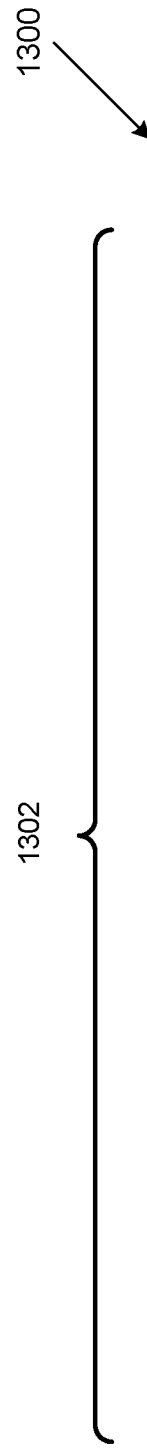

FIGURE 13

| 1304-1 | Beans 1304-2 | Peas 1304-3 | 1304-4 | Carrots 1304-5 | Tomatoes 1304-6 |
|---|---|---|---|---|---|
| Melbourne 1304-7 | Melbourne 1304-8 | Melbourne 1304-9 | Melbourne 1304-10 | Melbourne 1304-11 | Melbourne 1304-12 |
| Imported 1304-13 | Wholesale 1304-14 | Wholesale 1304-15 | Domestic 1304-16 | Wholesale 1304-17 | Wholesale 1304-18 |
| None 1304-19 | $2.00 1304-20 | $3.00 1304-21 | None 1304-22 | $1.80 1304-23 | $1.60 1304-24 |
| None 1304-25 | Retail 1304-26 | Retail 1304-27 | None 1304-28 | Retail 1304-29 | Retail 1304-30 |
| None 1304-31 | $2.20 1304-32 | $4.00 1304-33 | None 1304-34 | $3.20 1304-35 | $3.00 1304-36 |
| Sydney 1304-37 | Sydney 1304-38 | Sydney 1304-39 | Sydney 1304-40 | Sydney 1304-41 | Sydney 1304-42 |
| Imported 1304-43 | Wholesale 1304-44 | Wholesale 1304-45 | Domestic 1304-46 | Wholesale 1304-47 | Wholesale 1304-48 |
| None 1304-49 | $3.00 1304-50 | $4.00 1304-51 | None 1304-52 | $2.80 1304-53 | $2.60 1304-54 |
| None 1304-55 | Retail 1304-56 | Retail 1304-57 | None 1304-58 | Retail 1304-59 | Retail 1304-60 |
| None 1304-61 | $4.20 1304-62 | $5.00 1304-63 | None 1304-64 | $3.80 1304-65 | $4.00 1304-66 |

INTELLIGENT NORMALIZATION AND DE-NORMALIZATION OF TABLES FOR MULTIPLE PROCESSING SCENARIOS

BACKGROUND OF THE INVENTION

Field of the Invention

The present application relates generally to an improved data processing apparatus and method, and more specifically for mechanisms to aligning table cells when determining header cells of various files, and in particular hypertext markup language or "HTML" files. In files, header cells are typically aligned as a full row or column. The header cells then relate to cells typically aligned vertically below or horizontally right of the header cell. Therefore, cell alignment is an important prerequisite to extracting machine learning features for identifying the header cells, and also for relating data cells to the identified headers cells.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Description of the Related Art

Certain table conversion technology converts HTML based tables to two dimensional (2D) arrays; however such technology does not support complex tables with spanning cells and defined format styles.

SUMMARY OF THE INVENTION

A method, system and computer-usable medium are disclosed for determining vertical and horizontal alignment in a complex table. A structure data, such as an HTML file is created into a two dimensional array or table with orthogonal rows and columns of cells. For spanning rows and columns, values or object references are copied or given the same value in the cells. In certain implementations, deduplication based or row wise or column wise features occurs to create tables that are used for header detection.

BRIEF DESCRIPTION OF THE DRAWINGS

The present invention may be better understood, and its numerous objects, features, and advantages made apparent to those skilled in the art by referencing the accompanying drawings, wherein:

FIGS. 5A and 5B is a "Python" pseudo code listing to expand an HTML table into a two dimensional (2D) array;

FIG. 7 is a matrix generated from an HTML file;

FIG. 8 is a complex table with unmarked headers and multiple spanning cells;

FIG. 13 is a table where deduplication takes place along columns;

DETAILED DESCRIPTION

Figure 1:
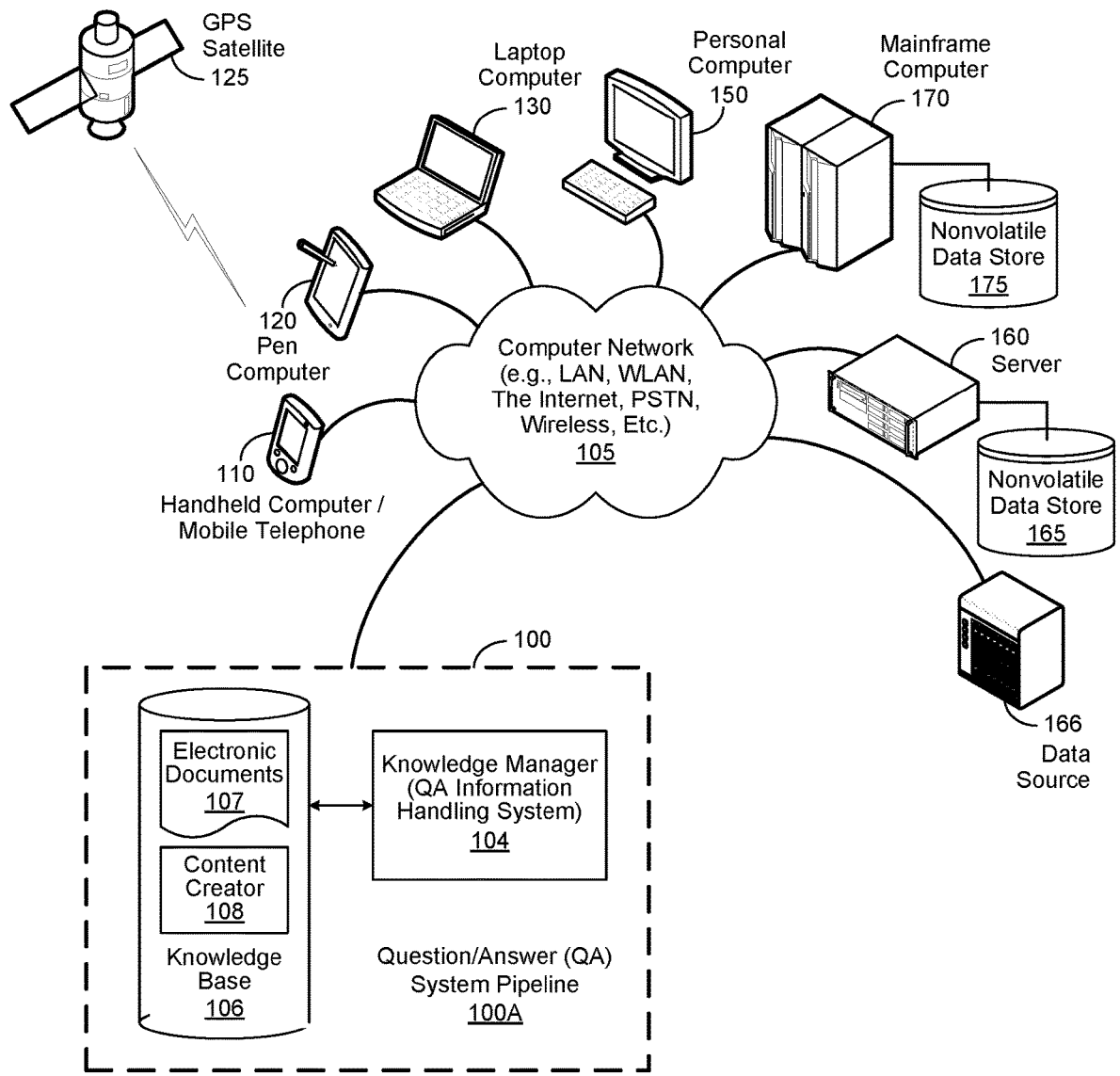
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a knowledge manager system (e.g., a question/answer (QA)) system 100 which is instantiated in a distributed knowledge manager environment 102. One example of a question/answer generation which may be used in conjunction with the principles described herein is described in U.S. Patent Application Publication No. 2011/0125734, which is herein incorporated by reference in its entirety. Knowledge manager 100 may include a knowledge manager information handling system 104 (comprising one or more processors and one or more memories, and potentially any other computing device elements generally known in the art including buses, storage devices, communication interfaces, and the like)coupled to a network 105. The environment 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and environment 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 105, a knowledge base 106 which can include a corpus of electronic documents or other data, a content creator 108, content users, and other possible sources of input. In various embodiments, the other possible sources of input can include location information. In one embodiment, some or all of the inputs to knowledge manager 100 may be routed through the network 105. The various computing devices 104 on the network 105 may include access points for content creators and content users. Some of the computing devices 104 may include devices for a database storing the corpus of data. The network 105 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection (represented as network 105), and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers. In various embodiments, the one or more answers take into account location information.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. In certain embodiments, the location information is determined through the use of a Geographical Positioning System (GPS) satellite 125. In these embodiments, a handheld computer or mobile telephone 110, or other device, uses signals transmitted by the GPS satellite 125 to generate location information, which in turn is provided via the network 105 to the knowledge manager system 100 for processing. As shown, the various information handling systems can be networked together using computer network 100. Types of computer network 105 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
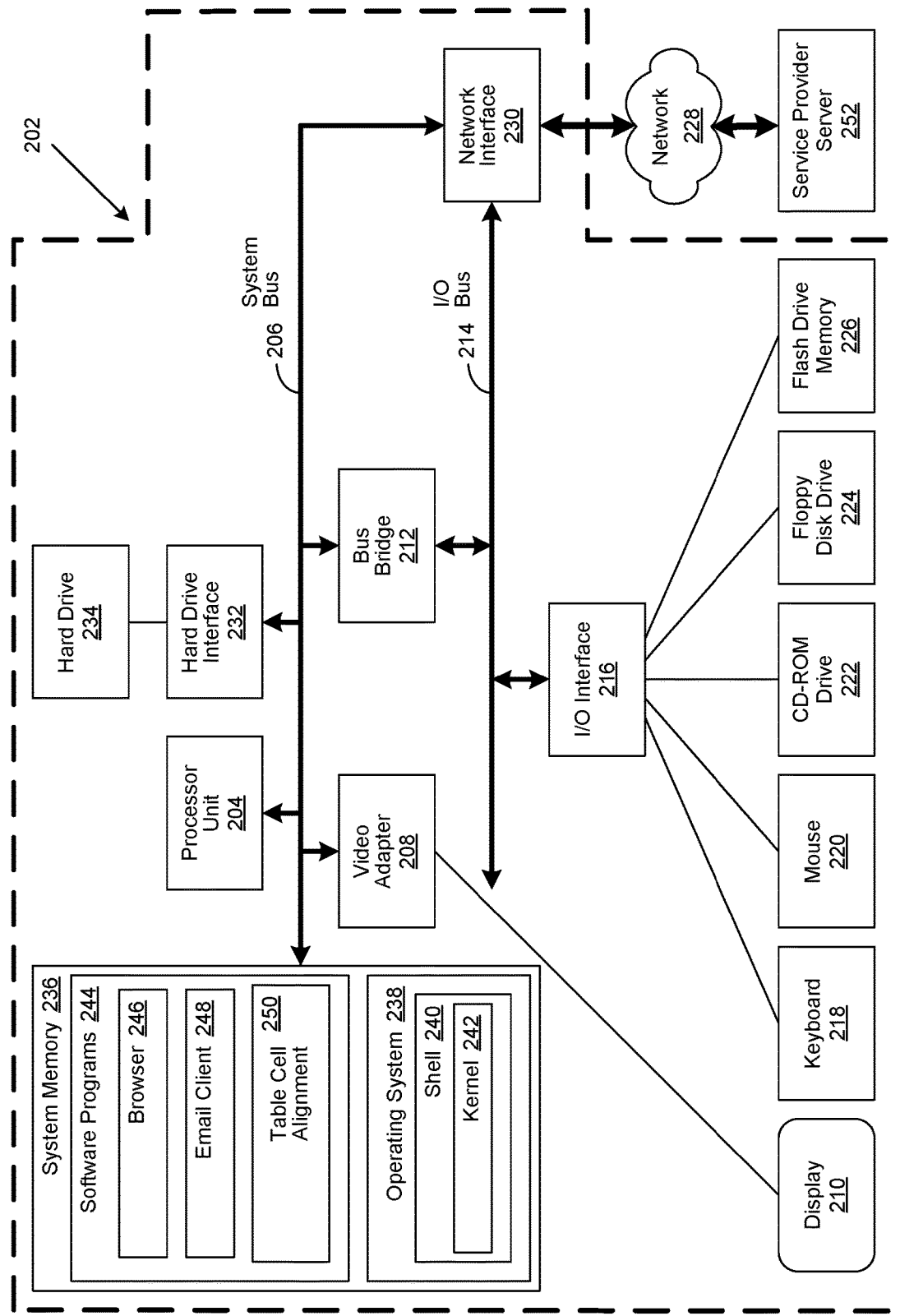
FIG. 2 is a simplified block diagram of an information handling system capable of performing computing operations.

FIG. 2 illustrates an information handling system 202, more particularly, a processor and common components, which is a simplified example of a computer system capable of performing the computing operations described herein. Information handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information handling system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information handling system 202) to send and receive network messages to the Internet using HyperText Transfer Protocol (HTTP) messaging, thus enabling communication with service provider server 252. In various embodiments, software programs 244 may also include a table cell alignment program 250. In these and other embodiments, the table cell alignment program 250 includes code for implementing the processes described herein below. In one embodiment, the information handling system 202 is able to download the table cell alignment program 250 from a service provider server 252.

The hardware elements depicted in the information handling system 202 are not intended to be exhaustive, but rather are representative to highlight components used by the present invention. For instance, the information handling system 202 may include alternate memory storage devices such as magnetic cassettes, Digital Versatile Disks (DVDs), Bernoulli cartridges, and the like. These and other variations are intended to be within the spirit, scope and intent of the present invention.

In order to determine table cell alignment in a table of a file or document, in certain embodiments, a HTML file or document with a table is analyzed. Web browsers create website tables using HTML files. In various computer applications, such as MS Word™ program, and MS Excel™ program, tables can be exported to an HTML file. Furthermore, other files such as PDF can be converted to HTML files.

Figure 3:
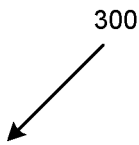
FIG. 3 is an HTML file that describes a table.
Figure 4:
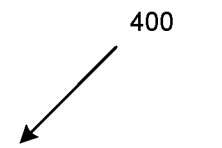
FIG. 4 is a table created by a browser from an HTML file.

FIG. 3 illustrates an example HTML file 300. In particular, file HTML file 300 defines a table of cells. The HTML file 300 describes particular cells 1 to 9, and their vertical and horizontal alignment or placement in a table. The HTML file 300 can be considered as structured data that represents a table. A browser application that processes the HTML file 300 creates a table as shown in FIG. 4. Visually, as illustrated in FIG. 4 the row wise (horizontal) and column wise (vertical) alignment of cells 1 to 9 may be obvious; however, in machine learning the row wise and column wise alignment of cells 1 to 9 may be uncertain.

Figure 5A:

FIGS. 5A and 5B is a "Python" pseudo code 500 to expand file or document with structured data representing a table, such as an HTML table into a two dimensional (2D) array or table. For example, using the HTML file 300, the algorithm as defined in pseudo code 500 performs converts the table defined by HTML file 300 with "row spanning" (rowspan) and "column spanning" (colspan) attributes into a 2D array or table, where the rows and columns represent cells that would be visually aligned. The algorithm performs a single pass over the HTML building the 2D array or table. The 2D array or table includes rows and columns that would be visually aligned, and contains object references to the original cells so that all attributes and cell identity is preserved.

Figure 6A:
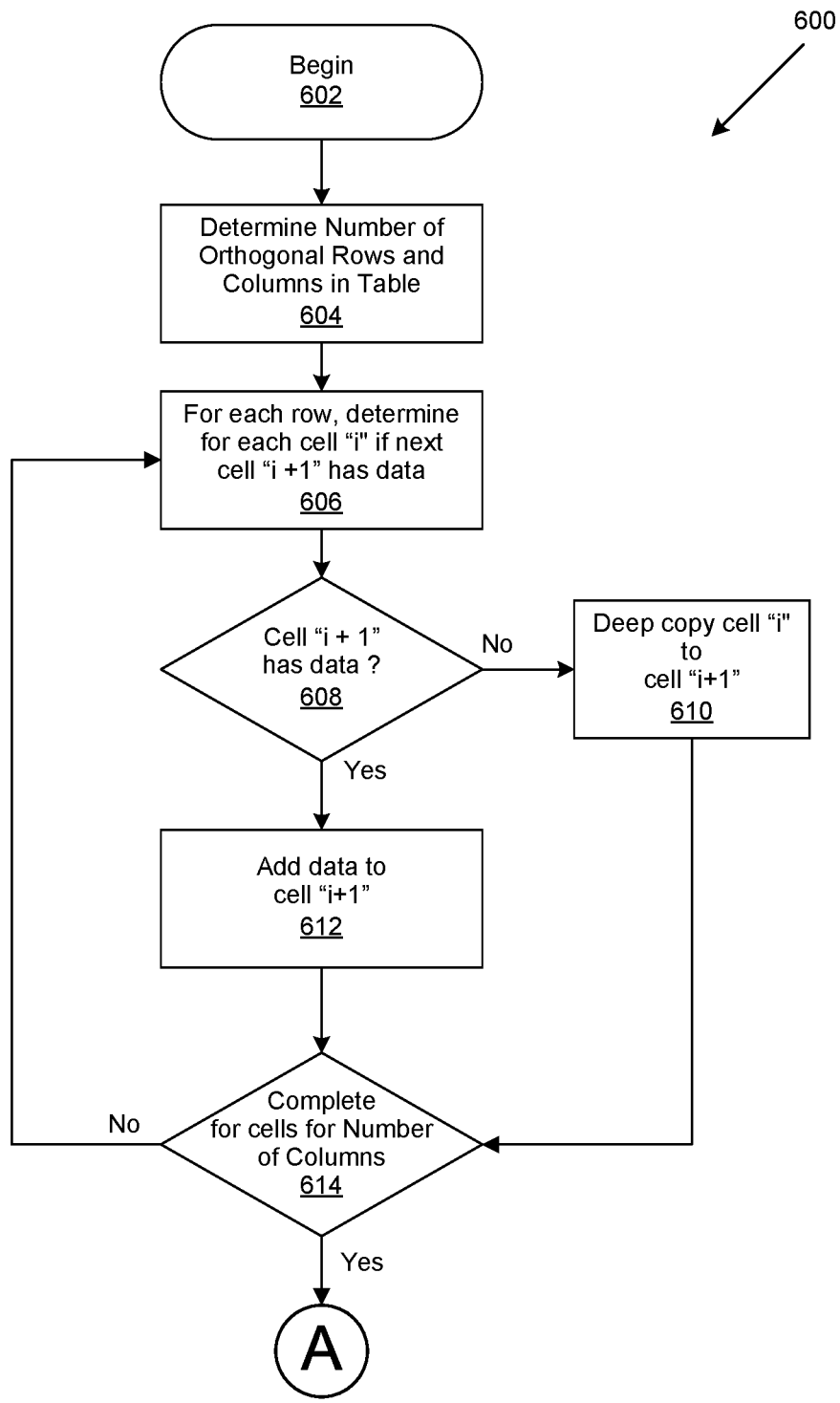
FIGS. 6A and 6B is a generalized flowchart of an operation to expand a document into a two dimensional (2D) array.
Figure 6B:
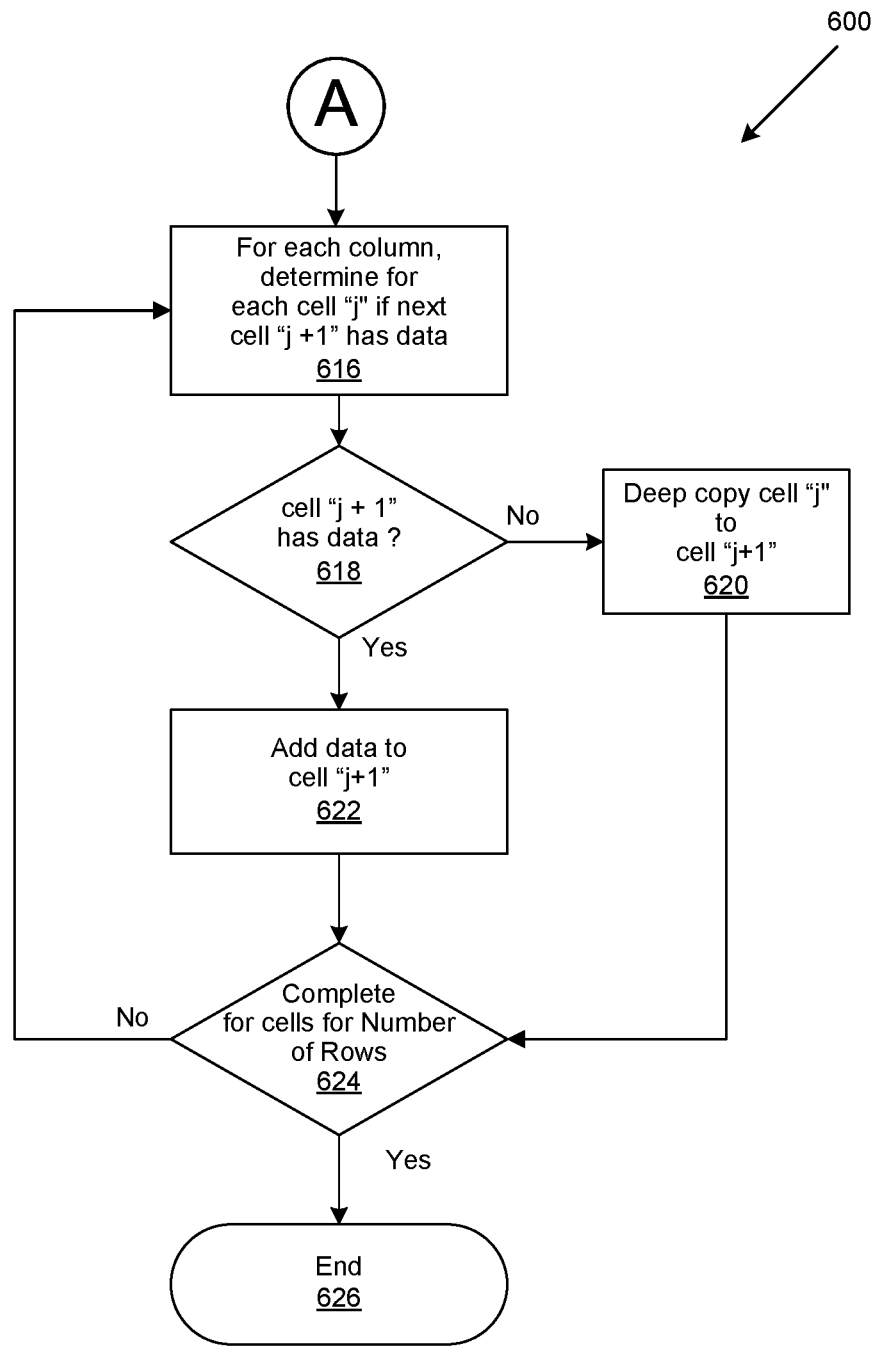

FIGS. 6A and 6B is a generalized flowchart 600 that describes an operation to expand a table into a two dimensional (2D) array or table. In particular, flowchart 600 describes in general the algorithm of pseudo code 500 of FIGS. 5A and 5B. The operation begins at step 602. At step 604, a determination is made as to the number of rows and columns are in a table. The rows and columns are orthogonal to one another. There may be rows that span across columns, and there may be columns that span across rows in the table. The operation seeks to copy cell values or object references to adjacent cells in spanning rows, and copy cell values to adjacent cells in spanning columns. As discussed above, the operation creates a 2D array or table that includes rows and columns that would be visually aligned, and contains object references to the original cells so that all attributes and cell identity is preserved. Attributes and cell identity include vertical and horizontal alignment.

In certain implementations, the copying is from left to right for rows, and top to bottom for columns. Beginning with the first row in the table, at step 606 the cell "i" in the row is compared with the adjacent cell "i+1" to determine if cell "i+1" has data. If cell "i+1" does not have data, following the "No" branch of step 608, at step 610, a deep copy is performed of cell "i" to cell "i+1". A deep copy includes all the attributes of cell "i". If cell "i+1" has data, following the "Yes" branch of step 608, at step 612, the data is added to cell "i+1". For the number of orthogonal columns to the rows, if the number of cells for the row is not complete, following the "No" branch at step 614, step 606 is performed. If all the cells in the row have been completed, then the "Yes" branch at step 614 is followed.

Beginning with the first column in the table, at step 616 the cell "j" in the column is compared with the adjacent cell "j+1" to determine if cell "j+1" has data. If cell "j+1" does not have data, following the "No" branch of step 618, at step 620, a deep copy is performed of cell "j" to cell "j+1". A deep copy includes all the attributes of cell "j". If cell "j+1" has data, following the "Yes" branch of step 618, at step 622, the data is added to cell "j+1". For the number of orthogonal rows to the columns, if the number of cells for the column is not complete, following the "No" branch at step 624, step 616 is performed. If all the cells in the row have been completed, then the "Yes" branch at step 624 is followed. At step 626, the operation 600 ends. It is to be understood, that in certain embodiments, the steps performed for columns can take place before steps performed on rows.

FIG. 7 is a matrix or table 700 that is generated from the HTML file 300 using the pseudo code 500. In this example, each entry is a reference to the original HTML tag of HTML file 300, such that cell identity and attributes are preserved. In certain implementations, such as machine learning, determination as to cell alignment, and in particular header cell determination can be performed. For example in matrix 700, a determination can be made that cell 7 is aligned with cells 1, 6, 2, and 4 by inspecting the same row and column indexes in the matrix 700.

FIG. 8 is a complex table 800 unmarked headers and multiple spanning cells. It is evident in table 800 that the columns are not aligned. Furthermore, multi-row or multi-column cell comparisons at the cell level are not trivial or intuitive.

Figure 9:
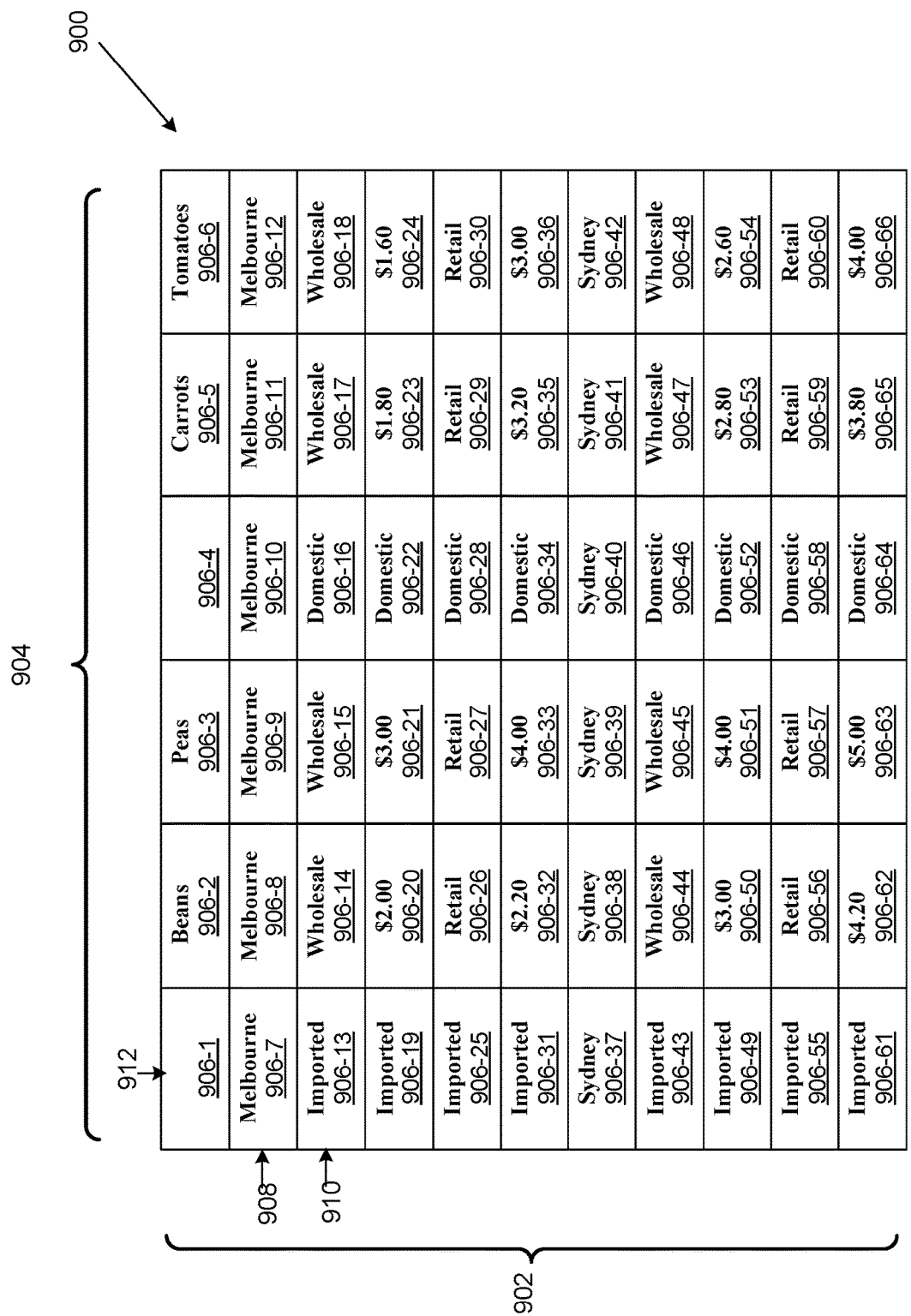
FIG. 9 is an expanded table with spanning rows and columns.

FIG. 9 is an expanded table 900 with spanning rows and columns. In certain implementations, table 900 is derived using the algorithm described in reference to FIG. 5 and FIG. 6 above. In this example, table 900 is defined by orthogonal rows 902 and columns 904. Table 900 includes cells 906. In performing the algorithms described in FIG. 5 and FIG. 6, spanning cells are created row wise and column wise. For example, the value "Melbourne" spans across the second row 908. A deep copy is performed based on cell 907-7 which contains "Melbourne", for cells 906-8 to 906-12. In other words, "Melbourne" spans across cells 906-7 to 906-12. In the third row 910, the value "Wholesale" which is found in cell 906-14 is duplicated for cell 906-15, since cell 906-15 has no data. "Wholesale" spans across cells 906-14 and 906-15. Likewise, for the third row 910, "Wholesale" which is found in cell 906-17 is duplicated for cell 906-18. "Wholesale" spans across cells 906-17 and 906-18. This operation is performed for all the rows in table 900. Then a column wise operation is performed.

For example, for the first column 912, cell 906-13 contains the value "Imported." For the adjacent rows 906-19, 906-25 and 906-31, "Imported" is deep copied. "Imported" spans across cells 906-13, 906-19, 906-25 and 906-31. In a similar manner, for the first column 912, the value "Imported" is included in cells 906-43, 906-49, 906-55, and 906-61. This operation is performed for all columns in table 900.

Although, table 900 provides that columns can be fetched easily, and multi-row or multi-column features can be computed, the original information in table 800 is not preserved. Original information that includes number of cells, spanning cells, and actual number or row characters is not preserved.

Figure 10:
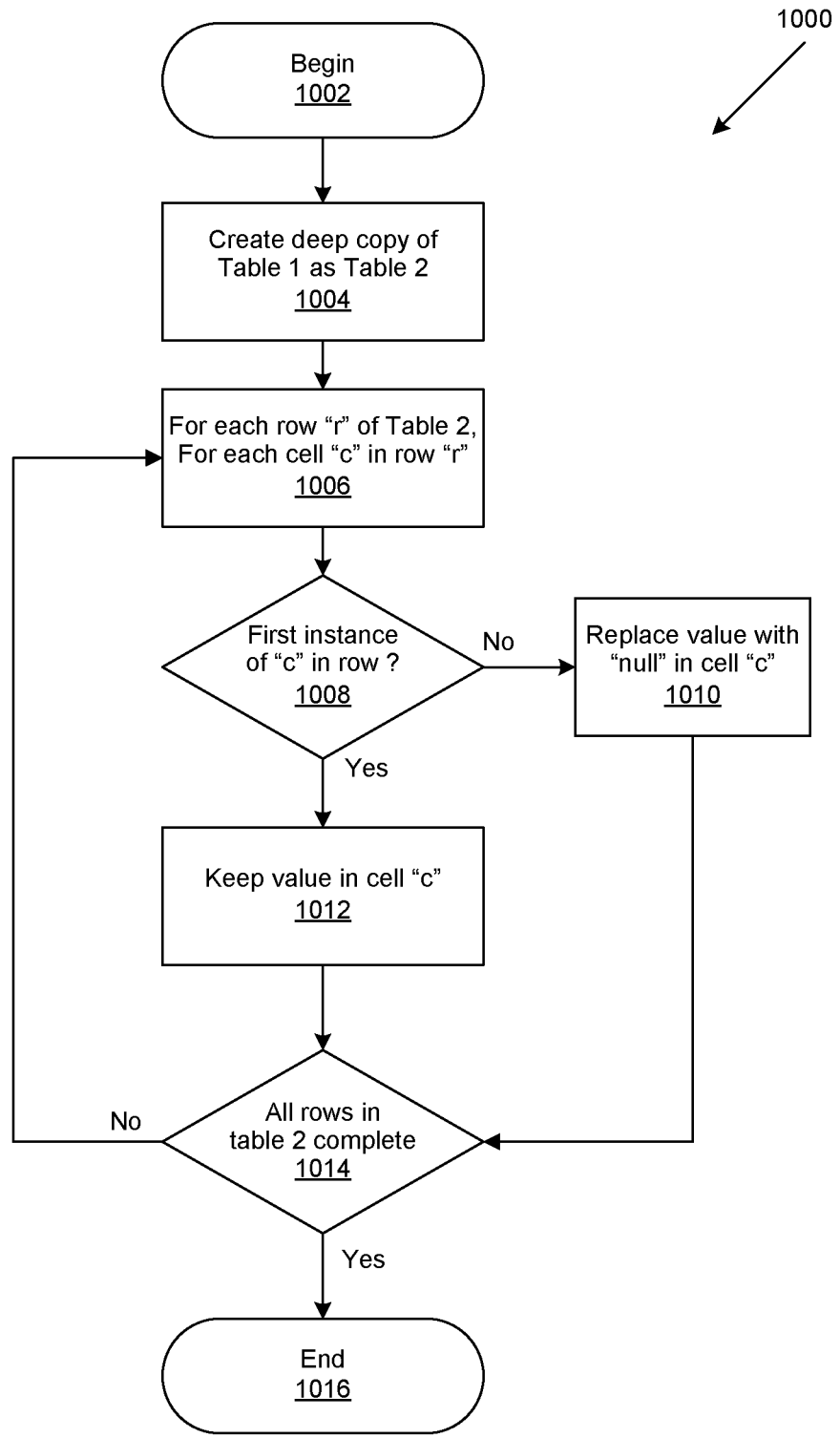
FIG. 10 is generalized flowchart for an operation for computation of row features.

Therefore, in certain embodiments, operations for deduplication for computations for row features and column features. FIG. 10 is a generalized flowchart 1000 that describes an operation for computation of row features. In particular, flowchart 1000 describes deduplication steps to prepare computation of row features in an expanded table, such as table 900. At step 1000, the operation begins. At step 1004 a deep copy of an expanded table 1, such as table 900 described above, is created. The created table is referred as table 2. At step 1006, for each row "r" in table 2, for each cell "c" in row "r" a determination is made. If the value or object reference in "c" of row "r" is not the first instance, then following the "No" branch of step 1008, the value or object reference of cell "c" is replaced with "null." If the value or object reference of "c" is the first instance in the row "r", then following the "Yes" branch of step 1008, the value or object reference in "c" is kept. If other all rows in the table 2 have been determined, then following the "Yes" branch of step 1014 the operation ends at step 1016. If other rows are to be determined, following the "No" branch of step 1014, step 1016 is performed.

Figure 11:
FIG. 11 is a table where deduplication takes place along rows.

FIG. 11 is a table 1100 where deduplication takes place along rows 1102. In this example, the deduplication is based on expanded table 900. Table 1100 includes cells 1104. In certain embodiments following the flowchart 1000, certain cells 1104 are given a value or object reference of "null."

Figure 12:
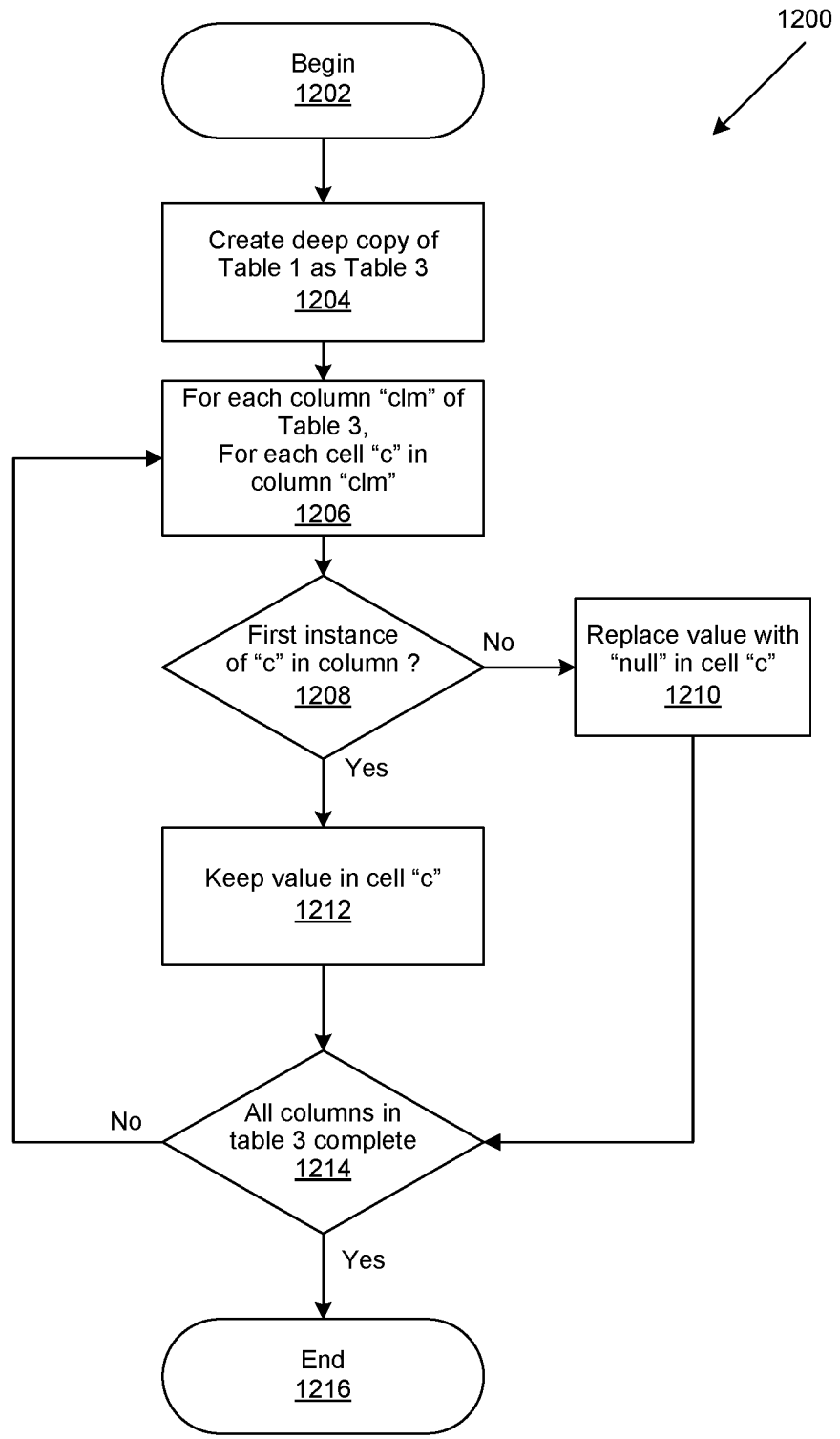
FIG. 12 generalized flowchart for an operation for computation of column features.

FIG. 12 a generalized flowchart 1200 that describes an operation for computation of column features. In particular, flowchart 1200 describes deduplication steps to prepare computation of column features in an expanded table, such as table 900. At step 1200, the operation begins. At step 1204 a deep copy of an expanded table 1, such as table 900 described above, is created. The created table is referred as table 3. At step 1206, for each row "clm" in table 3, for each cell "c" in row "clm" a determination is made. If the value or object reference in "c" of column "clm" is not the first instance, then following the "No" branch of step 1208, the value or object reference of cell "c" is replaced with "null." If the value or object reference of "c" is the first instance in the column "clm", then following the "Yes" branch of step 1008, the value or object reference in "c" is kept. If other all columns in the table 3 have been determined, then following the "Yes" branch of step 1214 the operation ends at step 1216. If other rows are to be determined, following the "No" branch of step 1214, step 1216 is performed.

FIG. 13 is a table 1300 where deduplication takes place along columns 1302. In this example, the deduplication is based on expanded table 900. Table 1300 includes cells 1304. In certain embodiments following the flowchart 1200, certain cells 1304 are given a value or object reference of "null."

In certain embodiments, the expanded table "t1", such as table 900, can be used to compute multi-row and multi column features for header detection models. The deduplicated table "t2", such as table 1100, can be used to compute single row features for header detection models. The deduplicated table "t3", such as table 1300, can be used to compute single column features for header detection models.

Figure 14:
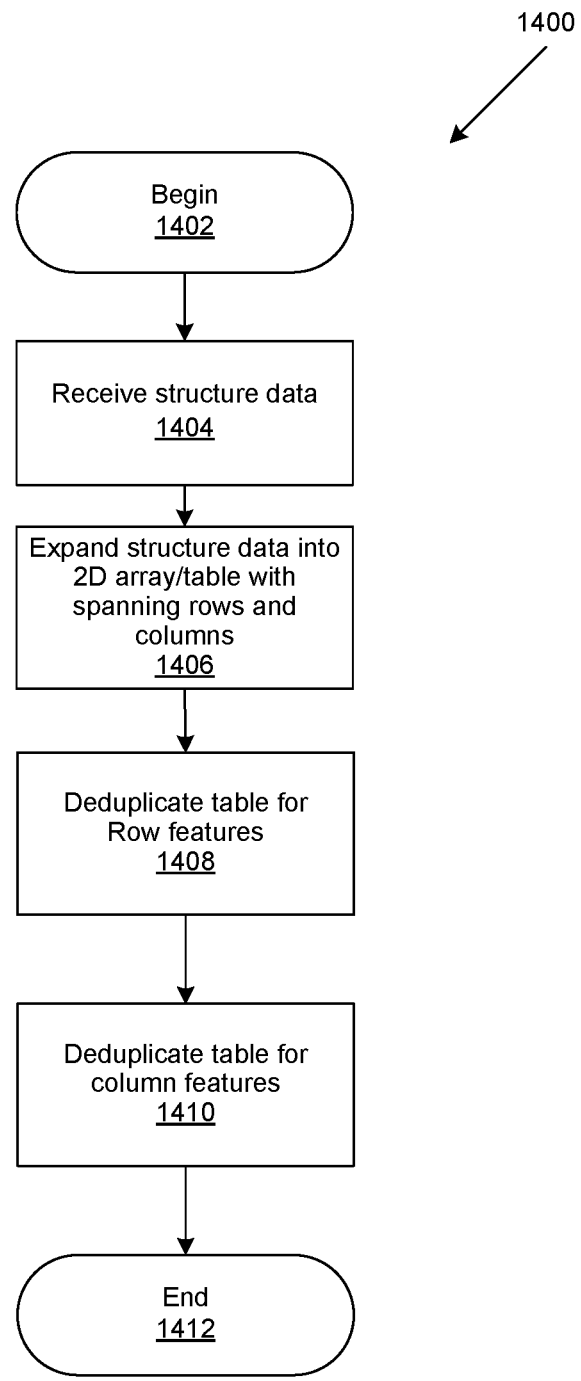
FIG. 14 is a generalized flowchart of the operation for table cell alignment.

Referring to FIG. 14, a flowchart of a data processing flow 1400 of a table cell alignment operation is performed. In particular flow 1400 is directed to vertically and horizontally aligned cells in a complex table structure. At step 1402, the process begins. At step 1404, a structure data or table is received. For certain embodiments, the structure data is an HTML file or document that is describes a table. The structure data includes defined row and column space indexing for cells in the table. At block 1406, the table is expanded into a 2D array or table with spanning rows and columns. Values or object references that span across rows or columns are copied in adjacent cells. The cells keep the original object references or values as defined in the received structure data. At block 1408, a deduplication is performed based on row features on the expanded 2D array or table to create a deduplicated row features able. For adjacent subsequent cells in a row, a null value is given. At block 1410, a deduplication is performed based on column features on the expanded 2D array or table to create a deduplicated column features able. For adjacent subsequent cells in a column, a null value is given.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method to find vertically and horizontally aligned cells in a structure data, comprising:
   creating a two dimensional (2D) array from the structure data that includes orthogonal rows and columns of cells with object references, wherein the structure data is an HTML file representing a table, and the creating is performed using an algorithm that converts a table defined by the HTML file with row spanning and column spanning;
   determining spanning rows and columns in the 2D array;
   copying the object references of adjacent cells in the spanning rows and columns to create an expanded table with spanning rows and columns;
   copying for a row of the 2D array, all attributes of a cell "i" to an adjacent cell "i+1" if the cell "i+1" does not have data until the rows of the 2D array are complete; and
   copying for column of the 2D array, all attributes of a cell "j" to an adjacent cell "j+1 if the cell "j+1" does not data for until the columns of the 2D array are complete.

2. The method of claim 1, wherein:
   the object references defines vertical and horizontal alignment in the structure data.

3. The method of claim 1, wherein:
   the cells include header values.

4. The method of claim 1, further comprising:
   deduplicating the expanded table with spanning rows and columns, based on row features, to create a deduplicated table for header cell detection.

5. The method of claim 1, further comprising:
   deduplicating the expanded table with spanning rows and columns, based on column features, to create a deduplicated table for header cell detection.

6. A system comprising:
   a processor;
   a data bus coupled to the processor; and
   a computer-usable medium embodying computer program code, the computer-usable medium being coupled to the data bus, the computer program code used for determining vertically and horizontally aligned cells in a structure data and comprising instructions executable by the processor and configured for:
   creating a two dimensional (2D) table from the structure data that includes orthogonal rows and columns of cells with values or object references, wherein the structure data is an HTML file representing a table, and the creating is performed using an algorithm that converts a table defined by the HTML file with row spanning and column spanning;
   determining spanning rows and columns in the 2D table;
   copying the values or object references of adjacent cells in the spanning rows columns to create an expanded table with spanning rows and columns;
   copying for a row of the 2D array, all attributes of a cell "i" to an adjacent cell "i+1" if the cell "i+1" does not have data until the rows of the 2D array are complete; and
   copying for column of the 2D array, all attributes of a cell "j" to an adjacent cell "j+1 if the cell "j+1" does not data for until the columns of the 2D array are complete.

7. The system of claim 6, wherein:
   the copying begins with spanning rows before spanning columns.

8. The system of claim 6, wherein:
   the copying begins with spanning columns before spanning rows.

9. The system of claim 6, further comprising:
   deduplicating the expanded table with spanning rows and columns, based on row features, to create a deduplicated table for header cell detection.

10. The system of claim 6, further comprising:
    deduplicating the expanded table with spanning rows and columns, based on column features, to create a deduplicated table for header cell detection.

11. A non-transitory, computer-readable storage medium embodying computer program code, the computer program code comprising computer executable instructions configured for:
    creating a two dimensional (2D) array from the structure data that includes orthogonal rows and columns of cells with object references, wherein the structure data is an HTML file representing a table, and the creating is performed using an algorithm that converts a table defined by the HTML file with row spanning and column spanning;
    determining spanning rows and columns in the 2D array;
    copying the object references of adjacent cells in the spanning rows and columns to create an expanded table with spanning rows and columns;
    copying for a row of the 2D array, all attributes of a cell "i" to an adjacent cell "i+1" if the cell "i+1" does not have data until the rows of the 2D array are complete; and
    copying for column of the 2D array, all attributes of a cell "j" to an adjacent cell "j+1" if the cell "j+1" does not data for until the columns of the 2D array are complete.

12. The non-transitory, computer-readable storage medium of claim 11, wherein:
the object references defines vertical and horizontal alignment in the structure data.

13. The non-transitory, computer-readable storage medium of claim 11, wherein:
the copying begins with spanning rows before spanning columns.

14. The non-transitory, computer-readable storage medium of claim 11, further comprising:
deduplicating the expanded table with spanning rows and columns, based on row features, to create a deduplicated table for header cell detection.

15. The non-transitory, computer-readable storage medium of claim 11, further comprising:
deduplicating the expanded table with spanning rows and columns, based on column features, to create a deduplicated table for header cell detection.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

18. The method of claim 1, wherein the 2D array is generated from an HTML file.

19. The system of claim 6, wherein the 2D array is generated from an HTML file.

20. The non-transitory, computer-readable storage medium of claim 11, wherein the 2D array is generated from an HTML file.

\* \* \* \* \*